United States Patent Office

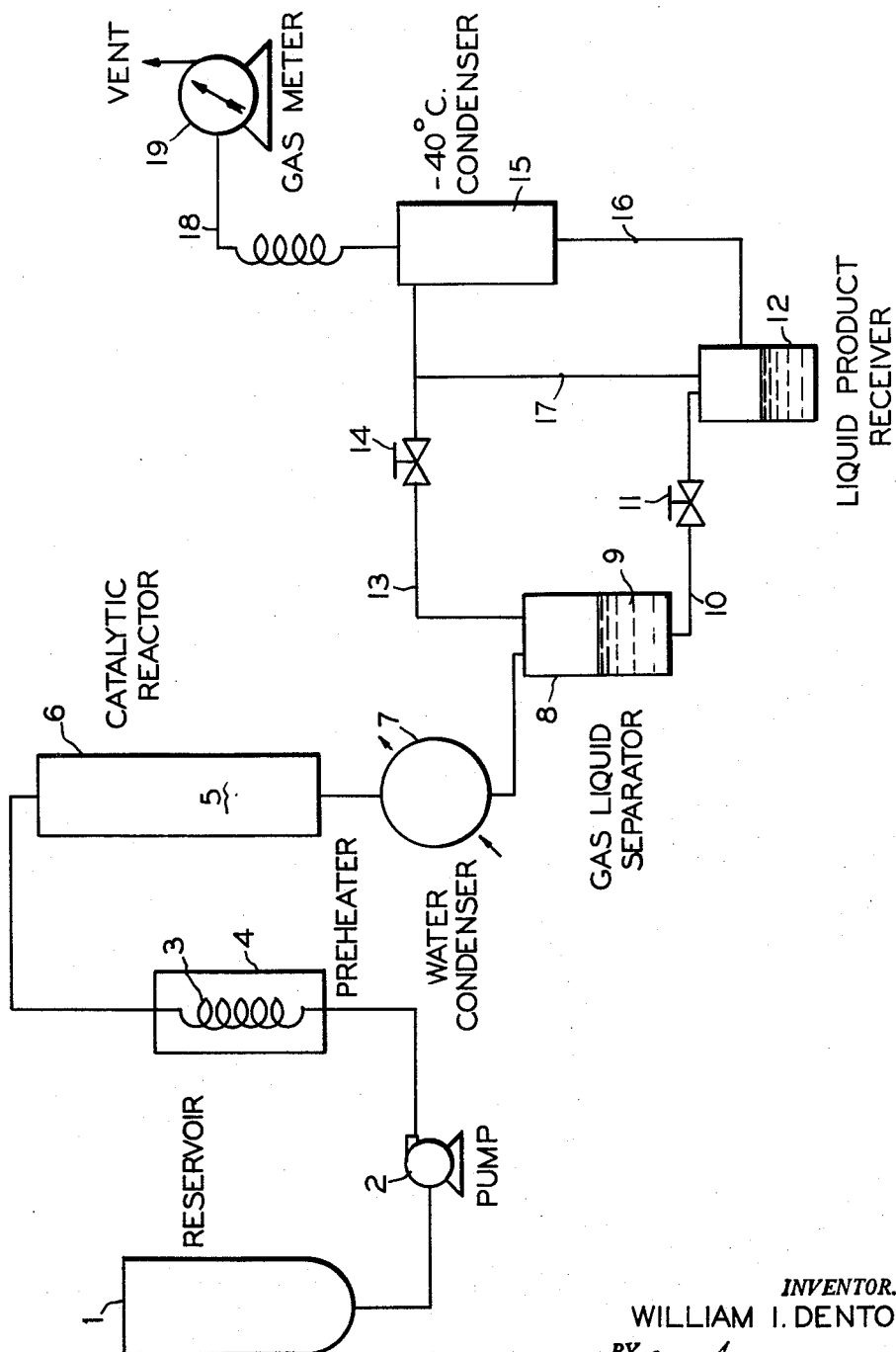

3,044,850
Patented July 17, 1962

3,044,850
PREPARATION OF LITHIUM PHOSPHATE
William I. Denton, Cheshire, Conn., assignor to Olin Mathieson Chemical Corporation, New Haven, Conn., a corporation of Virginia
Filed June 29, 1960, Ser. No. 39,694
4 Claims. (Cl. 23—107)

This invention relates to the preparation of an improved catalyst for the conversion of gaseous lower alkylene oxide, such as propylene oxide to an alcohol such as allyl alcohol, and particularly to a novel process for preparing a highly efficient catalyst for such isomerization reactions. This application is a continuation-in-part of copending application Serial Number 803,792, filed April 2, 1959, issued as U.S. Patent 2,986,585, dated May 30, 1961.

In this type of catalytic isomerization process, the catalysts described heretofore have been characterized by insufficient extents of conversion and inadequate production capacity to make them commercially attractive.

Thus, the trilithium phosphate catalyst of U.S. 2,426,264 was disclosed as resulting in the conversion at each pass of only about 17 to 21% of the propylene oxide feed to allyl alcohol, at production rates of 60 to 179 grams of allyl alcohol per liter of catalyst per hour.

The main object of this invention has been to provide a process for the preparation of improved catalyst for the conversion of propylene oxide to allyl alcohol, which catalyst results in a high extent of conversion at each cycle and is characterized by large productive capacities and high ultimate yields of allyl alcohol from the propylene oxide feed.

The foregoing and other objectives have been accomplished in the provision of catalyst characterized by extents of conversion in each cycle of 60 to about 75% with ultimate yields of 83 to 95%, and production rates of 250 to about 550 grams of allyl alcohol per liter of catalyst per hour. Furthermore, catalysts produced in accordance with this invention, when regenerated at appropriate intervals, remain effective after thousands of hours of use.

Such advantageous results have been made possible by the provision in accordance with this invention of catalyst consisting essentially of leached basic lithium phosphate, which has been prepared carefully under the required conditions and procedure, as specified hereinafter. As will be shown in greater detail, various preparations of substantially pure trilithium phosphate have displayed little or no activity in catalyzing the desired isomerization of propylene oxide to allyl alcohol. In contrast, catalytic activity many times that of the best materials of the prior art has been obtained with preparations in accordance with this invention wherein a basic lithium phosphate was precipitated and then all but a small fraction of its alkali metal hydroxide content was removed by leaching with water.

The initial basic lithium phosphate is precipitated in the presence of at least 0.2 mole, preferably 1 to 2 moles, of alkali metal hydroxide per mole of lithium orthophosphate ($Li_3PO_4$). The alkali metal hydroxide, for example, lithium hydroxide, sodium hydroxide, or potassium hydroxide, or a mixture thereof, may be present in the lithium salt solution, which is preferred, or in the phosphate solution or in both, its presence in solution prior to the formation of the precipitate being preferred as generally most effective.

The lithium solution is preferably one containing lithium hydroxide or lithium nitrate, although other soluble salts such as lithium acetate, lithium formate or lithium borate are useful. The phosphate solution is preferably of sodium or potassium orthophosphate or phosphoric acid or a mixture thereof. Best results have been obtained when the phosphate solution is added to the lithium solution.

The precipitate of basic lithium phosphate is then separated by filtration or centrifuging and must be subjected to multiple leachings with water to remove all but a small fraction of its alkali hydroxide content. The leaching is most readily accomplished by mixing the precipitate with many times its volume of water, filtering or centrifuging, and repeating this treatment at least two to four times. Unless this is done, the catalytic activity will be inadequate. For example, repeated washings of a filter cake of the precipitate with a large volume of water have resulted in a product of poor catalytic activity. For optimum activity, a minimum of three to five leachings are essential, resulting in an alkali hydroxide content in the lithium phosphate ranging from 0.05 to 1.0% by weight, expressed in terms of its alkali metal content.

It is noteworthy that the desired composition of the product is insufficient of itself to insure that it will display the required catalytic activity and selectivity, as consistently excellent results have been obtained only with the use of leached basic lithium phosphate products as described above.

Thus, naturally occurring lithium phosphate minerals such as lithiophilite, have been found to be catalytically inactive, as were also samples of lithium orthophosphate prepared by the neutralization of one mole of phosphoric acid with three moles of lithium hydroxide, or by the reaction of lithium nitrate and sodium orthophosphate either in an acid solution or in a solution made alkaline with ammonium hydroxide.

The evaluation of various catalysts was carried out in apparatus illustrated diagrammatically in the drawing, which is likewise representative of the operation of the process on a commercial scale.

The liquid propylene oxide is charged into a measuring vessel 1 and is fed into the system at the desired rate by a suitable pump 2, which may for example consist of a positive displacement pump of the reciprocating type. The liquid passes through a preheater consisting of a stainless steel spiral tube 3, housed within an electrically heated furnace 4, where the liquid is vaporized and heated to about reaction temperature.

The preheated oxide vapor is then passed downwardly through a cylindrical column of catalyst 5, maintained at the desired reaction temperature by means of suitable heating units or heat exchange jacket, not known, in a tubular stainless steel reactor 6. For example, the column may have a diameter of ⅞ inch and contain 120 cubic centimeters of catalyst. Preferably, the temperature is controlled independently at the preheater, reactor and reactor exit and temperature gradients in the reactor zone are minimized by enclosing the catalyst column in a cylindrical block of cast iron having walls two inches thick.

The products from the reactor are passed through a water-cooled condenser 7 and then into a gas-liquid separator 8. The liquid product 9 collected therein flows through discharge line 10 provided with valve 11 into receiver 12. Valve 11 is advantageously controlled automatically to maintain a desired level of liquid in separator 8. Vapor passes from the separator 8 through conduit 13, provided with valve 14, to condenser 15, maintained at −40° C. Liquid condensed therein flows through line 16 to receiver 12, the vapor space of which is connected by conduit 17 to line 12. The uncondensed gas passes from condenser 15 through line 18 to gas meter 19 and is then vented to the atmosphere. Runs made with the use of an active catalyst resulted in rather small amounts of non-condensed gas, for example 0.05 cubic foot during a 21 hour run at 275° C. at 0.5 space velocity. The liquid product in receiver 12 was weighed and analyzed at the end of each run, separation generally being effected by fractional distillation.

In the evaluation of catalysts prepared by various methods for use in the isomerization of an alkylene oxide to the corresponding unsaturated alcohol, the activity of the catalyst is measured by the extent of conversion of oxide to alcohol per pass through the reactor. Thus, a fairly active catalyst results in over 40% conversion and a catalyst of excellent activity can result in the conversion of about 75% of the oxide to alcohol for each pass through the catalyst bed.

The selectivity of the catalyst is likewise of great importance in view of the possibility of other conversions, it being well known for example that alkylene oxides can be isomerized to aldehydes as well as other carbonyl compounds. The occurrence of such side reactions results in the consumption of the starting alkylene oxide to products other than the desired alcohol. With the use of a highly selective catalyst, such side reactions are suppressed, so that unconverted alkylene oxide can be recovered and again passed through the reactor, resulting in ultimate yields of alcohol as high as over 90% to 95% of the starting oxide. The ultimate yield, which is thus a measure of the selectivity of the catalyst can be determined by dividing the weight of alcohol obtained by the weight of oxide consumed (weight of recovered oxide subtracted from the weight passed through the reactor) or, generally more conveniently, by dividing the weight of the alcohol product by the total weight of all products other than recovered oxide. For commercial success, the catalyst should be sufficiently selective as to result in ultimate yields of the desired alcohol product amounting to over 80 to 95%, preferably over 85%.

The following tables summarize the yield data obtained with the apparatus and procedure described above, using catalysts prepared as indicated. Reaction temperature was 275° C. and the space velocity was 0.5 (volume of liquid propylene oxide feed per hour divided by the volume of the catalyst column). It is noteworthy that the attempted use of granular lithiophilite as catalyst resulted in the conversion of only 0.8% of propylene oxide to allyl alcohol. No material improvement resulted even after purification of the mineral by treatment with acid.

Inadequate catalytic activity or selectivity or both were shown in the following preparations of lithium orthophosphate.

| Prep. | Solution 1 | Solution 2 | Order of Addition | Yield of Allyl Alcohol | |
|---|---|---|---|---|---|
| | | | | Per Pass | Ultimate |
| (a) | [1] 3.1 LiOH | [1] 3 $H_3PO_4$ | 1 to 2 | 0 | |
| (b) | 4.2 LiOH | 3 $H_3PO_4$ | 2 to 1 | 6.7 | 73 |
| (c) | 5.2 LiOH | 3 $H_3PO_4$ | 2 to 1 | 14.6 | 49 |
| (d) | 4 LiOH | 3 $Na_3PO_4$ | 1 to 2 | 20.4 | 80 |
| (e) | 3 LiOH | 3 $H_3PO_4$ and 1 NaOH | 2 to 1 | 35.2 | 68 |
| (f) | 3.3 $LiNO_3$ | 3 $H_3PO_4$ | 2 to 1, then add 4 $NH_4OH$. | 7.1 | 24 |
| (g) | 3 $LiNO_3$ | 9 $Na_3PO_4$ | 1 to 2 | 2.0 | |
| (h) | 3 $LiNO_3$ | 4.5 $Na_3PO_4$ | 1 to 2, then add 2.5 NaOH. | 11.7 | 29 |
| (i) | 3 $LiNO_3$, 6 $HNO_3$. | 9 $Na_3PO_4$, 1.5 NaOH. | 1 to 2 | 2.2 | |
| (j) | 3 $LiNO_3$ | 4.5 $(NH_4)_3PO_4$, 0.75 $NH_4OH$. | 1 to 2 | 0 | |
| (k) | 3 $LiNO_3$ | 4.5 $Na_3PO_4$, 0.75 NaOH. | 1 to 2 | 10.3 | 32 |

[1] Numbers indicate equivalents of reagent per mol of $Li_3PO_4$ formed.

The above lithium orthophosphate preparations in general involved reagent solutions at concentrations of 5 to 40% by weight, precipitation being effected at a temperature of 30° to 60° C. Variations in reagent concentration and temperature were without significant effect on the catalytic properties. In each case, the precipitate was filtered and washed on the filter with successive portions of hot water. The washed precipitate was dried for 16 hours at 200° C. and was then subdivided into pieces of about 4 to 12 mesh.

The following lithium orthophosphate catalyst prepared in accordance with this invention displayed both excellent activity and selectivity.

| Example | Solution 1 | Solution 2 | Order of Addition | Yield of Allyl Alcohol | |
|---|---|---|---|---|---|
| | | | | Per Pass | Ultimate |
| 1 | 3 $LiNO_3$ | 4.5 $Na_3PO_4$, 0.75 NaOH. | 1 to 2 | 62.0 | 84 |
| 2 | 4 LiOH | 3 $Na_3PO_4$ | 2 to 1 | 70.6 | 83 |
| 3 | 3 LiOH | 4.5 $Na_3PO_4$ | 1 to 2 | 71.5 | 84 |
| 4 | 3 LiOH | 4.5 $Na_3PO_4$ | 2 to 1 | 67.8 | 95 |
| 5 | 3 LiOH | 3 $Na_3PO_4$, 1 NaOH. | 2 to 1 | 66.8 | 85 |
| 6 | 3 LiOH | 4.5 $Na_3PO_4$, 1.0 NaOH. | 1 to 2 | 59.2 | 91 |
| 7 | 4.2 LiOH | 3 $H_3PO_4$ | 1 to 2 (boil 3 hours). | 68.6 | 83 |
| 8 | 4.2 LiOH | 3 $H_3PO_4$ | 2 to 1 (boil 3 hours). | 56.3 | 85 |
| 9 | 3 $LiNO_3$ | 4.5 $Na_3PO_4$, 0.75 NaOH. | 2 to 1 | 60 | 92 |
| 10 | 4 $LiNO_3$ | 3 $K_3PO_4$, 1 KOH | 1 to 2 | 59.4 | 83 |
| 11 | 3.25 LiOH | 3 $H_3PO_4$ | 2 to 1 | 74.6 | 88 |

The above catalysts were prepared generally in accordance with the procedure and conditions of the following preferred process for the catalyst of Example 4.

A solution of lithium hydroxide was prepared by dissolving 126 grams (3 moles) of the monohydrate in 500 cc. of distilled water. A solution of sodium orthophosphate was prepared by dissolving 570 grams (1.5 moles) of the dodecahydrate in 750 cc. of distilled water and the solution was warmed to 30° to 60° C., preferably about 40° C. The latter solution was added in one or two minutes to the first, during agitation, and resulted in the formation of a precipitate at a pH of 12 to 14. The precipitate was filtered and washed and was then dispersed in 1.5 to 2 liters of distilled water at a temperature of 50° to 95° C. After thorough agitation of the suspension for ten to thirty minutes, the precipitate was again filtered and washed. The leaching with excess hot distilled water and filtration was repeated four more times, the final leaching solution having a pH of 10 to 11. The filter cake was dried for 16 hours in an oven at 200° C. and the catalyst was prepared for use by subdividing into pieces of about 4 to 12 mesh.

Modifications in the concentration of reagents in the reacting solutions between about 5 and 50% by weight or of precipitation temperatures within the range of about 30° C. to 90° C. had no important effect on catalytic properties. However, it is essential for the production of highly active and selective catalysts that the precipitated lithium phosphate should be initially a basic phosphate, that is, a lithium orthophosphate containing excess alkali hydroxide such as sodium, potassium or lithium hydroxide. Preferably, this result is obtained by the provision of excess alkali hydroxide in the solution during the formation of the precipitate. Less desirably, such result is also attained by heating a precipitated lithium orthophosphate with a solution containing more than 0.2 mole, preferably 1 to 2 moles, of alkali hydroxide per mol of precipitate for several hours at an elevated temperature, for example, at the boiling point for three hours or longer.

It is furthermore essential that substantially all the excess alkali hydroxide then be leached from the lithium basic phosphate. This is most readily accomplished, as described above, by suspending the precipitate in a large volume of hot distilled water and filtering, and repeating the leaching and filtration two to four times.

Both of the above essential features characterized the catalysts listed in Examples 1 to 11 in the above table.

The effect of inadequate leaching is shown in the following data on the catalytic properties of lithium phosphate prepared as set forth above with respect to Example 1, but subjected to the indicated number of leaching steps.

| | Number of Leaching Steps | | | |
|---|---|---|---|---|
| | 1 | 2 | 3 | 5 |
| Yield of Allyl Alchohol, percent; | | | | |
| per pass | 5.7 | 38.8 | 61.5 | 66.9 |
| ultimate | 27 | 75 | 82 | 87 |
| Residual metal hydroxide content, expressed as weight percent Na | 4.2 | 1.4 | 0.45 | 0.21 |

Similar data are shown below with respect to catalysts prepared by mixing a lithium nitrate solution with a solution containing potassium phosphate and hydroxide, and applying the indicated number of leaching treatments.

| | Number of Leaching Steps | | |
|---|---|---|---|
| | 1 | 3 | 5 |
| Yield of Allyl Alcohol, percent: | | | |
| per pass | 22 | 51.2 | 59.4 |
| ultimate | 45 | 87 | 83 |

In another comparative series, a catalyst (A) similar to that of Example 1, having been subjected to five successive leaching treatments, was tested for catalytic properties. A sample (B) of 150 grams, after five leaching treatments, was likewise tested after mixing with a solution of 2 grams of $Na_3PO_4 \cdot 12HO$ dissolved in 200 cc. of distilled water and evaporation of the water. A third sample C, similar to the second but treated with ten times as much sodium orthophosphate, was also tested. Catalytic properties and analyses were as follows:

| | Sample | | |
|---|---|---|---|
| | A | B | C |
| Yield of Allyl Alcohol, percent: | | | |
| per pass | 68.7 | 65.1 | 11.5 |
| ultimate | 83 | 87 | 69 |
| Residual content of basic sodium compound, expressed as weight percent Na | 0.28 | 0.51 | 1.65 |

The significance of the leaching step was further substantiated in the following results obtained with the use of trilithium phosphate catalyst prepared in accordance with Example 1 of U.S. 2,426,264, the precipitate being filtered on a Büchner funnel and very thoroughly washed in conventional manner by treatment on the filter with many successive portions of water.

| Reaction Temperature, °C. | Space Velocity | Conversion of oxide, percent | Yield of Allyl Alcohol, percent | |
|---|---|---|---|---|
| | | | Per pass | Ultimate |
| 233 | 0.64 | 37 | 28.4 | 77 |
| 286 | 0.44 | 11 | 8.9 | 80 |

Catalysts of this invention may advantageously be admixed with other ingredients which are inert or have no adverse activity. For example, about one-tenth to an equal weight of finely-divided activated carbon or diatomaceous earth may be added to the final suspension of the basic lithium phosphate before filtration or it may be mixed with the moist precipitate before drying. Two such mixtures, containing 30% by weight of infusorial earth and of activated charcoal, respectively, were used as catalyst at 275° C. and space velocity of 0.5. They resulted in yields of 57.1 and 52.5% of allyl alcohol per pass, respectively, and 86% and 84% utimate yields.

While the essential leaching step in accordance with the invention is preferably effected by agitating the separated precipitate of basic lithium phosphate with water heated to over 50° C. to form a dilute suspension and repeating the treatment after the precipitate has been separated by filtration, centrifuging or decantation, the leaching may be accomplished by other procedures providing adequate contact of substantially the entire surface area of the catalyst particles with water for extended periods of time. For example, water may be pumped or percolated through a column of the precipitated catalyst for a period of at least about 8 hours. As described above, treatment with water for short periods of time amounting to several hours or less, is not effective to accomplish the desired leaching.

When the leaching is carried out in the preferred manner, by the repeated formation of a dilute dispersion of the precipitate in water and separation therefrom, catalysts of about twice or more the effectiveness of the best prior art preparation are obtained when the operation is carried out rapidly. However, further appreciable impovement in the effectiveness of the catalyst is effected by providing an extended period of contract of the precipitate with the leaching water. By providing a contact period of at least 8 hours, for example, the yield per pass figure was increased from 52% to 70% at a reaction temperature of 275° C. One such extended period of contact may be applied during the last leaching treatment, with the earlier ones being carried out rapidly, or several treatments may be prolonged to provide the desired total period of contact.

Catalysts of optimum activity are generally characterized by a content of alkali metal hydroxide corresponding to up to about 1% by weight of the alkali metal, for example, up to about 3.4% by weight of lithium hydroxide, 1.7% sodium hydroxide or 1.4% potassium hydroxide. Catalysts of such composition resulting from the above-described precipitation and leaching procedures provide high yields per pass with isomerization reaction, generally over 60% at a reaction temperature of 275° C., as well as high ultimate yields of about 90% or more and continue to perform well for thousands of hours when properly regenerated at suitable intervals.

However, good results are obtainable when the excess basicity in the catalyst amounts to a content of up to about 4 or 5 percent by weight of alkali metal hydroxide or other basic compound, produced in accordance with the above-described precipitation and leaching procedures. The resulting catalyst is capable of effecting yields per pass of over 40% or 50% alcohol at 275° C.

Furthermore, it is noteworthy that lithium orthophosphate preparations resulting from precipitation in acidic solutions are ineffective as catalysts for isomerizing alkylene oxides such as propylene oxide to the corresponding alcohol. When gaseous propylene oxide is passed over such material at 275° C., little or no allyl alcohol is produced and generally, the yield is less than 10%. Although such preparations usually have a composition corresponding to trilithium phosphate, desired catalytic structure is not achieved. Furthermore, such products appear to be dehydrated more extensively and to release axcess alkali metal compounds present other than trilithium phosphate on treatment with water more rapidly than the catalytic products prepared in accordance with this invention.

Preferably, the initial precipitation is carried out by adding the phosphate solution to the lithium solution, as this procedure provides one or more of the following important advantages: higher yield per pass, higher ultimate yield, and increased durability for use in the isomerization.

Sharply contrasting results depending on the order of the addition have been obtained particularly when the lithium solution is one of lithium hydroxide and the phosphate solution is one of phosphoric acid or of sodium phosphate or of both.

When these reagents are used in the proportions theoretically required for the formation of trilithium phosphate or with an excess of phosphoric acid, the products are ineffective catalysts.

Products resulting from the addition of an excess of lithium hydroxide solution to a solution of phosphoric acid yield products of inadequate catalytic properties, probably due to the formation of a considerable proportion of the precipitate in acid solution. However, considerable improvement may be brought about by digesting such precipitate in the presence of the mother liquor at about the boiling point for a number of hours, and then applying a leaching treatment as described previously.

Products prepared by the gradual addition, with thorough agitation, of a phosphoric acid solution to an excess of lithium hydroxide solution are consistently highly effective catalysts, following an adequate leaching treatment. If the addition of phosphoric acid is so rapid or the agitation is insufficient, permitting the existence of acid regions in the reaction mixture, a period of digesting the precipitate in the mother liquor at about the boiling point may be advisable.

The preparation of catalyst from these two reagents is preferred because of the excellent properties of the product, ready availability and low cost of the reagents, and ease of control and reproducibility of the process.

The following example of a successful procedure using these reagents is illustrative of a preferred embodiment in accordance with the invention.

A solution of 136.5 g. (3.25 moles) of purified lithium hydroxide monohydrate in 2 l. of distilled water was prepared, filtered and heated to 85° to 90° C. A phosphoric acid solution containing 1 mole of $H_3PO_4$ was prepared by diluting 130 g. of 75% phosphoric acid with 130 ml. of distilled water. While the lithium solution was well stirred and maintained at 85° to 90° C., the phosphoric solution was added thereto dropwise during a one hour period. The mixture was then stirred for an hour and the white precipitate was separated by filtration. The filter cake was mixed with 1500 ml. of distilled water, maintained in suspension at room temperature for a period of 15 to 20 minutes and filtered. This leaching treatment was repeated four more times, the period of maintaining the suspension being extended to eight hours in one of the treatments. The final filter cake was dried for 16 hours in an oven at 200° C., and the catalyst was prepared for use by subdividing into pieces of about 4 to 12 mesh.

In the above preparation, the pH of the mother liquor was 12.4, and the pH values of the filtrates from the successive leaching treatments were: 12.0, 11.7, 11.6, 11.6 and 11.4. In the first filter cake, the ratio of moles of lithium per mole of phosphorus was 3.06 and decreased to a value of 3.01 in the final product. On evaluation in the isomerization of propylene oxide to allyl alcohol at 275° C., values of 74% yield of alcohol per pass and ultimate yield of 88% were obtained for this catalyst.

The foregoing experimental data have therefore confirmed the importance of the manner of preparation of the catalyst in accordance with the process of this invention, in order to secure the described selectivity, activity, and durability in the isomerization reaction. Such advantages are made available by the provision of a leached basic lithium phosphate, initially prepared in the presence of 0.2 to 2 moles of alkali metal hydroxide or other basic alkali metal compound, from which all but 0.05 to 1% by weight of such excess residual alkali metal has been removed by leaching.

The leached basic lithium phosphate catalyst in accordance with this invention provides excellent results at isomerization reaction temperatures within the range of about 250° to 350° C., preferably at about 275° C. to 300° C.

The rate of feed of liquid alkylene oxide may be varied from space velocities of about 0.3 to 2.0, preferably 0.5 to 1.0. Space velocity is defined herein as the volume of liquid feed per hour divided by the volume occupied by the catalyst. Residence time in the reaction zone within the above range amounts to about 2 to 50 seconds.

The activity of the catalyst will undergo a gradual decrease in activity with extended use. However, the selectivity of the present catalyst is not significantly impaired even after extended use, so that the ultimate yield of the desired alcohol remains high. Thus, while frequent regeneration is not essential, it is generally economical to restore the activity by suitable treatment with the conversion per pass had decreased to a value of 30 to 45%. Such a point may be reached after use of the catalyst for 24 to 48 hours, or expressed differently, after the catalyst has converted about 10 to 15 times its weight of oxide to alcohol.

Catalysts of this invention which have been somewhat inactivated by use may readily be restored to the initial high activity by extraction at elevated temperatures, preferably within the range of about 100 to 150° C., with a liquid oxygen-containing organic solvent such as acetone, propylene oxide, methyl alcohol, and dioxane, with aqueous solutions of such compounds, or by means of hydrocarbon solvents at higher temperatures. Catalysts may be recycled in this way forty or fifty times and still display the high original activity and selectivity after thousands of hours of use, and in fact, may even be somewhat improved after such regeneration.

The novel catalysts prepared in accordance with this invention are likewise used to advantage in the conversion of butylene and amylene oxide, particularly the 1-2 oxides, to the corresponding alcohol.

Modifications in the detailed examples specifically described above will be apparent to those skilled in the art and are included within the scope of the following claims.

I claim:
1. In the preparation of a lithium phosphate catalyst, the process comprising forming a first aqueous solution containing lithium ions by dissolving in water a lithium compound chosen from the group consisting of lithium hydroxide, lithium nitrate, lithium acetate, lithium formate, and lithium borate, forming a second aqueous solution containing phosphate ions by dissolving in water a phosphate compound chosen from the group consisting of sodium phosphate, potassium phosphate and phosphoric acid, adding to at least one of said solutions an amount of alkali metal hydroxide adjusted to provide on mixing of said solutions 0.2 to 2 moles of alkali metal hydroxide per mole of lithium orthophosphate, then mixing the said solutions at a temperature of about 30° to 90° C. to form a precipitate of basic lithium phosphate in a reaction mixture having the aforesaid alkalinity, isolating the said precipitate, leaching the said precipitate by forming a dilute suspension thereof in water at about 20° C. to 95° C. and isolating said precipitate at a reduced content of alkali metal hydroxide, at least twice repeating the said leaching step, drying the said precipitate, and recovering leached basic lithium phosphate having a content of residual alkali metal hydroxide equivalent to 0.05% to about 1% by weight thereof of said alkali metal.

2. The process as set forth in claim 1, wherein the said basic lithium phosphate precipitate is formed by the addition of the said second solution to the said first solution.

3. The process as set forth in claim 1, wherein the said basic lithium phosphate precipitate is formed by the addition of a phosphoric acid solution to a solution containing an excess of lithium hydroxide.

4. The process as set forth in claim 1, wherein the said leaching step is carried out with water at about 50° C. to 95° C. and is repeated two to four times.

References Cited in the file of this patent
UNITED STATES PATENTS
2,426,264    Fowler et al. _____ Aug. 26, 1947